United States Patent
Yazdani et al.

(10) Patent No.: US 8,701,135 B2
(45) Date of Patent: Apr. 15, 2014

(54) METHOD AND SYSTEM FOR PROGRAM PRESENTATION ANALYSIS

(75) Inventors: Amir Yazdani, Portland, OR (US); Michael Vinson, Piedmont, CA (US)

(73) Assignee: Rentrak Corporation, Portland, OR (US)

( * ) Notice: Subject to any disclaimer, the term of this patent is extended or adjusted under 35 U.S.C. 154(b) by 252 days.

(21) Appl. No.: 13/096,964

(22) Filed: Apr. 28, 2011

(65) Prior Publication Data

US 2012/0278828 A1 Nov. 1, 2012

(51) Int. Cl.
*H04H 60/33* (2008.01)
*H04H 60/35* (2008.01)

(52) U.S. Cl.
USPC .............................................. 725/19; 725/9

(58) Field of Classification Search
USPC ................................................. 725/9, 14–20
See application file for complete search history.

(56) References Cited

U.S. PATENT DOCUMENTS

| | | | |
|---|---|---|---|
| 5,481,294 A * | 1/1996 | Thomas et al. | 725/20 |
| 2006/0195861 A1* | 8/2006 | Lee | 725/19 |
| 2009/0328112 A1* | 12/2009 | Weaver | 725/87 |
| 2010/0050202 A1* | 2/2010 | Kandekar et al. | 725/14 |
| 2010/0131970 A1* | 5/2010 | Falcon | 725/19 |
| 2011/0093878 A1* | 4/2011 | Falcon | 725/14 |

* cited by examiner

*Primary Examiner* — Benjamin R Bruckart
*Assistant Examiner* — Jason Thomas
(74) *Attorney, Agent, or Firm* — Perkins Coie LLP

(57) ABSTRACT

A computing system is programmed to detect if program content is presented on a channel. A program signature is determined based on set-top box tune data from set-top boxes in a market in which it is known the program content was presented. The program signature can be compared to program signatures from other local markets or from the same market to determine if the same program content was presented. In some embodiments, the program signature represents the number of set-top boxes simultaneously tuned to the channel on which the program content is presented.

20 Claims, 6 Drawing Sheets

| # | STB ID | Tune Start | | Tune End | Channel |
|---|---|---|---|---|---|
| 1 | 1001 | 2011-03-01 | 8:50:00 | 2011-03-01 10:14:59 | 40 |
| 2 | 1001 | 2011-03-01 | 10:15:00 | 2011-03-01 10:15:30 | 41 |
| 3 | 1001 | 2011-03-01 | 10:15:30 | 2011-03-01 10:20:00 | 10 |

METHOD AND SYSTEM FOR PROGRAM PRESENTATION ANALYSIS

BACKGROUND

In television market analysis, it is important to estimate how many viewers have seen a particular program that is presented in a number of different local markets. For example, such information can be used to set advertising rates and to determine local network ratings. In another application, determining whether particular programs are shown can be used to ascertain if local content presenters are presenting programs in accordance with required program schedules imposed by networks or other program sources.

One common way of estimating how many viewers have potentially seen a program is to record what shows were seen by a small sample of viewers in a particular market. The data representative of viewing by the small sample of viewers is then extrapolated to predict the viewing behavior of a larger audience. Alternatively, digital watermarks or other codes can be embedded in programs and detected by listening receivers in each of the markets. Both methods may be inaccurate depending on how many viewers are in the sample set, how well the data is recorded, or how well the watermarks are detected.

Given these problems, there is a need for an improved system for estimating the number of viewers that have seen a program and that can reliably determine if a particular program was presented within a local market.

DETAILED DESCRIPTION

Figure 1:
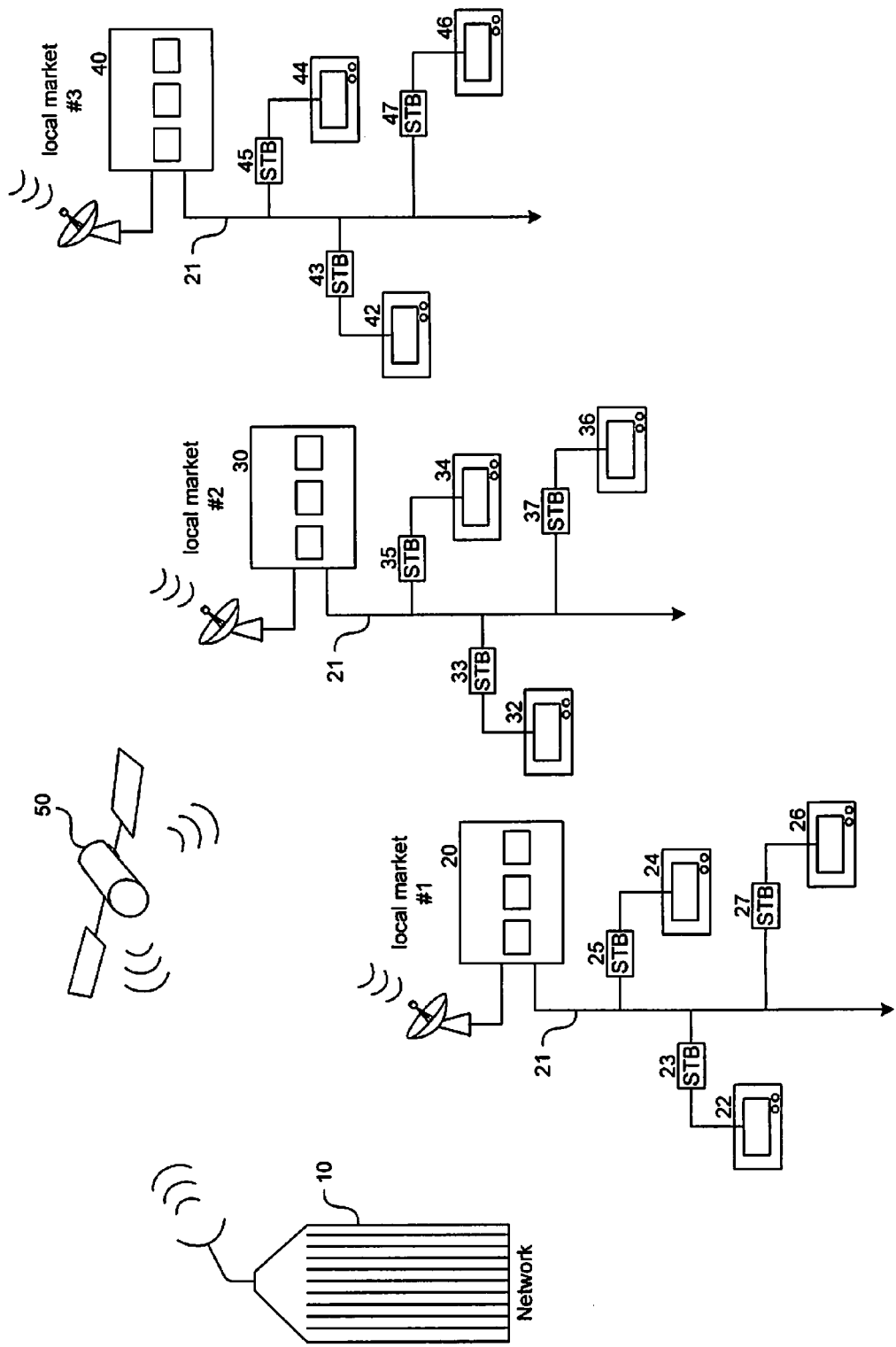
FIG. 1 illustrates a representative content distribution system including a network and a number of content presenters that present program content in different local markets.

The technology disclosed herein relates to a computing system and a computer-implemented method for determining if program content that was presented on one channel is the same as program content presented on another channel. As used herein, the term "channel" is meant to be interpreted broadly to include any means by which a user can tune to, or connect with, a stream of audio/video data. Channels therefore include cable TV channels, satellite channels, radio frequency channels, wired or wireless computer communication links including online video, etc.

As will be explained in detail herein, a first program signature is generated for program content known to have been presented on a first channel and a second program signature is generated for unknown program content presented on a second channel. If the first and second program signatures match (i.e., are sufficiently similar in shape or characteristic features), then the program content presented on each channel are likely the same. In some embodiments, program signatures are determined from set-top box tune data by measuring the number of viewers who are watching a channel on which known or unknown program content is being presented. The first and second program signatures are compared by comparing the relative shape or other characteristic features of the signatures. Signatures that do not vary by more than a defined amount are determined to match; signatures that vary in excess of the defined amount are deemed to represent different program content.

In some embodiments, the set-top box tune data is conditioned prior to generating the program signatures. One or more conditioning operations may be applied to the set-top box tune data. For example, the set-top box tune data may be conditioned by removing data representing channel changes that occur in less than a defined duration. As another example, the set-top box tune data may be conditioned by removing data representing set-top box tune data where the set-top box is determined to be associated with a television or other viewing device that is likely turned off. As yet another example, other smoothing operations may be applied to the tune data to remove anomalous spikes, valleys, and or other artifacts in the tune data prior to analyzing the program signatures.

In another embodiment, a non-transitory, computer readable media has instructions stored thereon that when executed, cause a processor to determine if a program is shown on a channel by comparing program signatures.

Various embodiments of the invention will now be described. The following description provides specific details for a thorough understanding and an enabling description of these embodiments. One skilled in the art will understand, however, that the invention may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

FIG. 1 illustrates a representative content distribution system that includes a network, content provider, or other broadcaster 10 that produces or aggregates content for distribution and a number of local content presenters 20, 30, and 40 that deliver the content in different market regions or to different subsets of the market. In the embodiment shown, the local content presenters 20, 30 and 40 are shown as cable companies that receive content from the content distributor 10 via a satellite 50 or other distribution mechanism. In turn, the local content presenter 20 distributes the received content to a number of subscribers 22, 24, and 26 via a cable 21. Each subscriber controls which program content they view with a set-top box 23, 25, and 27 that serves as an interface between the cable 21 and their television, video monitor, or other device that can be used to view the audio/video content. The set-top boxes may comprise cable television converters, satellite receivers, digital video recorders "DVR" (e.g. TiVO recorders) or other similar devices such as gaming stations (e.g. Microsoft X-box) and the like, as well as other electronic components which allow a user to tune to a desired audio/video stream. Broadly stated, the phrase "set-top box" is used herein to refer to any device, component, module, or routine that enables tune data to be collected from an associated video playback device. Set-top boxes may be stand-alone devices or set-top box functionality may be incorporated into the video playback devices. Each local content presenter 20, 30, and 40 has the ability to detect, record, and communicate tuning events at each subscriber's set-top box that are indicative of what channel a user is viewing at any given time. In addition, some content presenters may have the ability to detect, record, and communicate how a user interacts with the set-top box such as by pressing play, fast forward, rewind, pause, etc. if the set-top box incorporates DVR functionality.

Although each of the local content presenters 20, 30, and 40 is shown as being a cable company in FIG. 1, it will be appreciated that the disclosed system is operable with local broadcasts that are transmitted via other distribution channels. For example, satellite operators may serve geographically distinct markets or markets which overlap with the markets of other cable or over the air program distribution companies. Satellite operators distribute content directly to subscribers via satellite dishes that are coupled to one or more set-top boxes that are owned or leased by the subscriber. Content may also be distributed to subscribers through, for example, other wired or wireless technologies such as via fiber-optic networks, WiMax or other wireless networks, etc.

As previously discussed, most local content presenters agree to a program schedule with networks that sets the times when particular programs are to be presented. The networks use this schedule for a variety of purposes including setting advertising rates for sponsors of the programs or other advertisers. However, not all local content presenters adhere to the schedule. For example, a program that is scheduled to be presented in one time slot may be shown by a local content presenter in another time slot or may be presented in additional time slots that were not agreed to by the content presenter, or might not be shown at all. Although the change in the presentation slot may be in violation of prior agreements with the networks, detecting such variance is a challenging problem.

The failure of local content presenters to abide by agreed-to program or content schedules can have a significant financial impact on content providers. For example, if a broadcast affiliate or national cable network is scheduled to present the program "Modern Family" on Wednesday nights at 9 p.m. PST and another cable company in a different market area is scheduled to present "Modern Family" at 8 p.m. CST then ABC can set its advertising rates assuming that the program will be presented during prime viewing time. The sponsors of the program would like to know an estimate of how many viewers possibly saw the program. In addition, if the local content presenters don't stick to the agreed schedule, then the sponsor may be paying for prime time advertising slots when the sponsored program is not actually being presented during prime time. Therefore, the technology disclosed herein provides a system to detect what program content is actually presented during a particular time slot in a given market area and/or to determine the number of potential viewers of the content.

In accordance with some embodiments of the disclosed technology, a programmed computing system operates to determine whether a particular piece of program content is presented in a local market by determining a program signature that is unique to the content. As used herein "program content" may be all or a portion of a piece of content that is viewable by a consumer. Program content may therefore encompass the entirety of a program (e.g., a 60 minute reality show, a 2 hour sporting event) or a portion of the program (e.g., the halftime show of a football game, the first 30 minutes of each program). In the embodiment shown in FIG. 2, a standalone or networked computing system 100 receives viewing data from a data aggregator 124 via a communication link 120 such as a local area network (LAN), wide area network (WAN), or the Internet. The data aggregator 124 receives set-top box tune data from one or more of the local content presenters indicating the channels tuned to by some or all of the subscribers connected to their network. The tune data may be transmitted over communication link 120, or may be periodically provided to the computing system 100 on a computer readable media such as a CD-ROM, DVD, flash memory, etc. In some embodiments, rather than receiving the data from a data aggregator 124, the computing system 100 may receive the set-top box data directly from the set-top boxes or from the local content presenters. In addition to the set-top box tune data, the computing system 100 also receives programming scheduling information. A program scheduler 126 such as FYI Television, Inc. or other service receives and combines schedule data from each of a number of content providers that indicates the times at which particular program content is to be presented and on what channel. The combined schedule information is provided to the computing system 100 via the communication link 120 or via some other computer readable media.

As will be set forth in further detail herein, the computing system 100 operates to determine a program signature for each presented piece of program content. The program signatures are stored in a memory 102 of the computing system 100. The program signatures are used to detect whether a particular piece of program content was likely presented in any local market and to estimate the number of possible viewers of the program content. Advertisers, networks, content providers or other authorized users 140 can access the computing system 100 via the communication link 120 or via some other means to receive information regarding the presentation of particular program content. For example, the authorized user 140 can receive information indicating if program content was actually presented in a local market at its designated time and channel as well as receiving an estimate of the number of viewers that viewed the program.

Figures 3, 4:
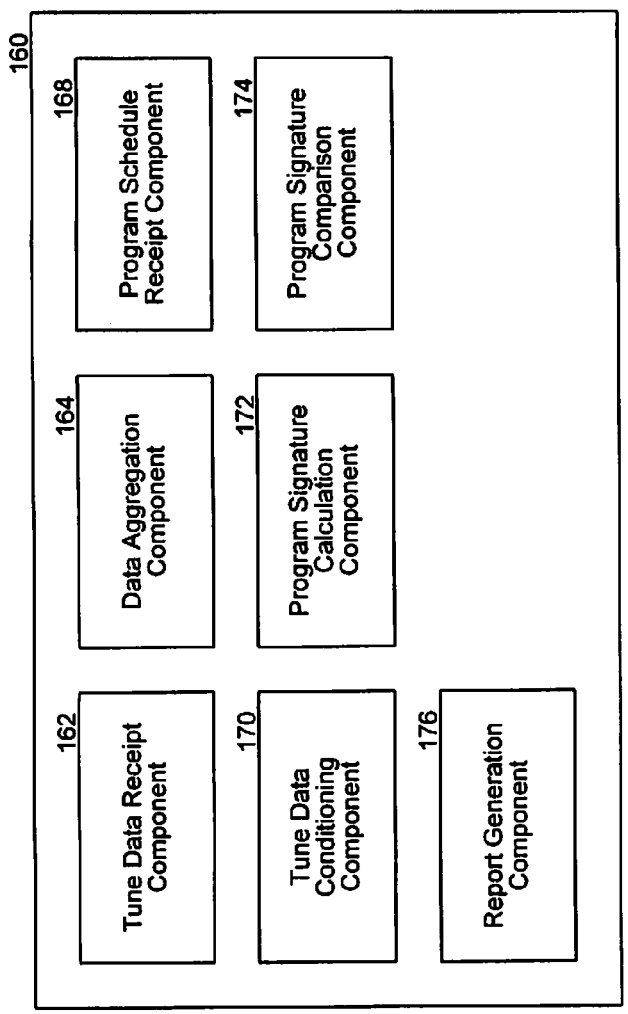
FIG. 3 illustrates a block diagram of a computer-implemented system for detecting if program content is presented.
FIG. 4 illustrates a portion of a set-top box tune data log received from a content presenter.

FIG. 3 illustrates a block diagram of a computer-implemented program 160 that operates to determine if program content was presented in a local market. The program 160 includes a set-top box tune data receipt component 162, a data aggregation component 164, a program schedule receipt component 168, a set-top box tune data conditioning component 170, a program signature calculation component 172, a program signature comparison component 174, and a report generation component 176. Each of the components 162-176 can be implemented with a general purpose processor that is configured to execute a series of programmed instructions that are stored on a non-transitory, computer-readable media. Alternatively, the components 162-176 can be implemented with special purpose processors such as digital signal processors (DSPs), application specific integrated circuits (ASICs), field programmable gate arrays (FPGAs) or other electronic components as described below.

Figure 2:
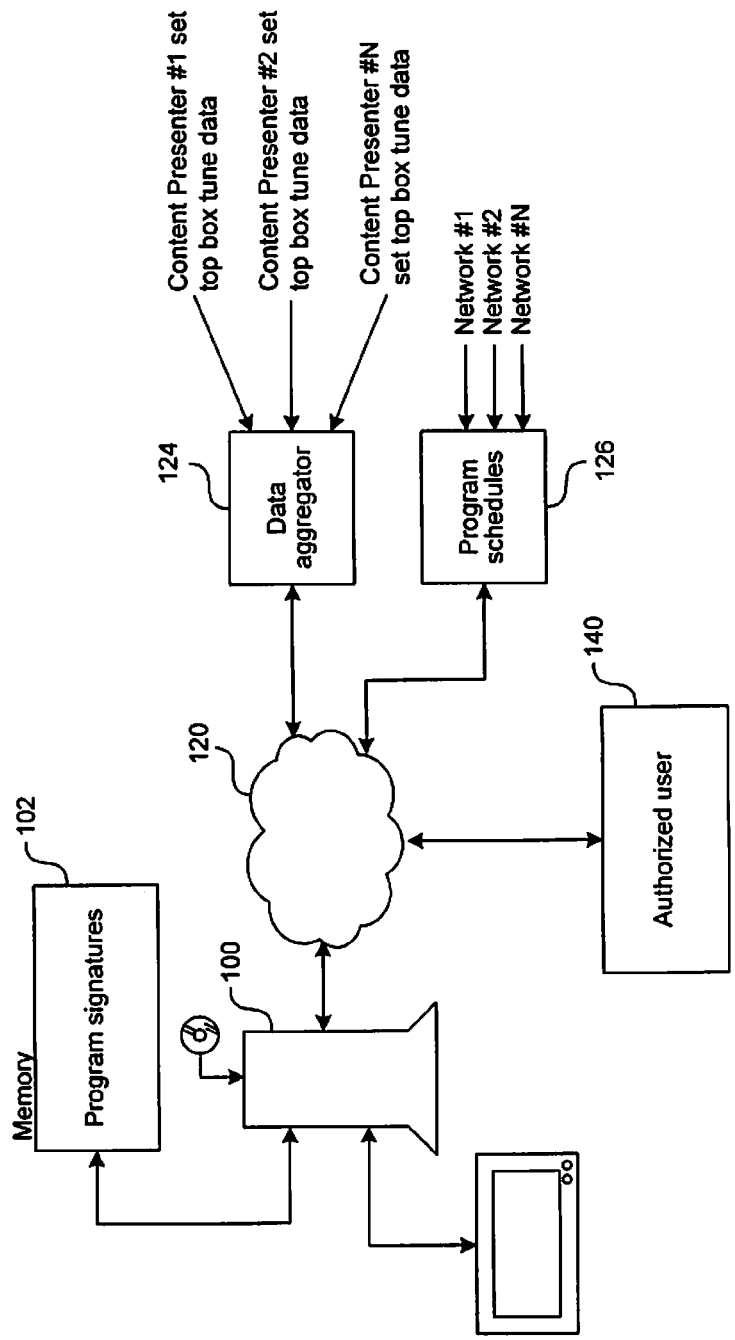
FIG. 2 illustrates a system for detecting if program content was presented.

The data receipt component 162 operates to receive set-top box tune data from one or more of the local content presenters. In some embodiments, the set-top box tune data from each market is collected by the data aggregator 124 as shown in FIG. 2. Alternatively, the computing system 100 may be configured to receive the set-top box tune data directly from each of the local content presenters or from the set-top boxes themselves.

FIG. 4 illustrates a representative sample of a set-top box tune data file that is received by the data receipt component 162. The set-top box tune data file indicates what channel each subscriber's set-top box was tuned to at any given time. In some embodiments, the set-top box tune data file includes a set-top box identification number, a start time at which a subscriber began watching a channel, possibly an end time at which a subscriber changed channels, and a channel number. Start and end times may include both a calendar date as well as an indication of the time of day. In some embodiments, other data may be included in the set-top box tune data file. In some embodiments, the set-top box tune data files from the local content presenters are collected by the data aggregator 124 and provided to the computing system 100 on a periodic basis such as several times a day, several times a week, several times a month, etc. The received data files may be of significant size, since they potentially include tuning data from millions of set-top boxes for a defined period of time.

The program schedule receipt component 168 is configured to receive program schedule data from the networks or other content providers. The schedule data can be combined by a schedule creator 126 such as FYI Television, Inc. of Grand Prairie, Tex., or Tribune Media Services (TMS) of Chicago, Ill., or other similar service providers. In some embodiments, the computing system 100 can receive schedule data from each of the networks or other content providers directly to determine the combined schedule. Once the program schedule information is known to the computing system, the computing system 100 overlays the program schedule onto the aggregated viewing data by correlating the scheduled program name to the channel and date/time on which the program was presented. Therefore, the computing system 100 is able to determine the program content that each set-top box was tuned to at any given time.

The set-top box tune data conditioning component 170 is configured to condition the set-top box tune data. In some embodiments, the tune data is conditioned by removing any channel changes having a duration that is less than a minimum value. For example, channels viewed for less than 30 seconds in the set-top box tune data can be removed from the tune data on the assumption that viewers that tuned to a particular channel for less than 30 seconds did not substantively view the program content. Similarly, set-top boxes that appear in the tune data to be tuned to the same channel for more than a determined maximum length of time (e.g. more than 4 hours) are considered as being associated with a television or other viewing device that is turned off. Another technique for estimating whether a television or other viewing device is turned off is described in U.S. patent application Ser. No. 13/081,437, filed Apr. 6, 2011, and titled "Method and Apparatus for Detecting Non-Powered Televisions," which is herein incorporated by reference in its entirety. Therefore, these data entries in the set-top box tune data file can be removed as well.

The program signature calculation component 172 is configured to determine a program signature for each presented piece of program content. In some embodiments, the computing system 100 is programmed to calculate on a periodic basis (e.g. second by second or some other time interval such as every 5 seconds, every 10 seconds, etc.) the number of set-top boxes from each local content presenter that are simultaneously tuned to the channel on which the program content was known to have been presented in a particular market. For example, if the program "Modern Family" was known to be shown from 9-10 p.m. on channel 40 in Market #1, the program signature calculation component 172 calculates the program signature for that episode of "Modern Family" by determining on a periodic basis the number of set-top boxes in Market #1 that were simultaneously tuned to channel 40 from 9-10 p.m. The program signature can be represented as a two-dimensional graph of a number of viewers that were simultaneously watching the same program versus the duration of the program. In some embodiments, the graph is normalized for the number of viewers watching the program or in some other way.

Figure 5A:
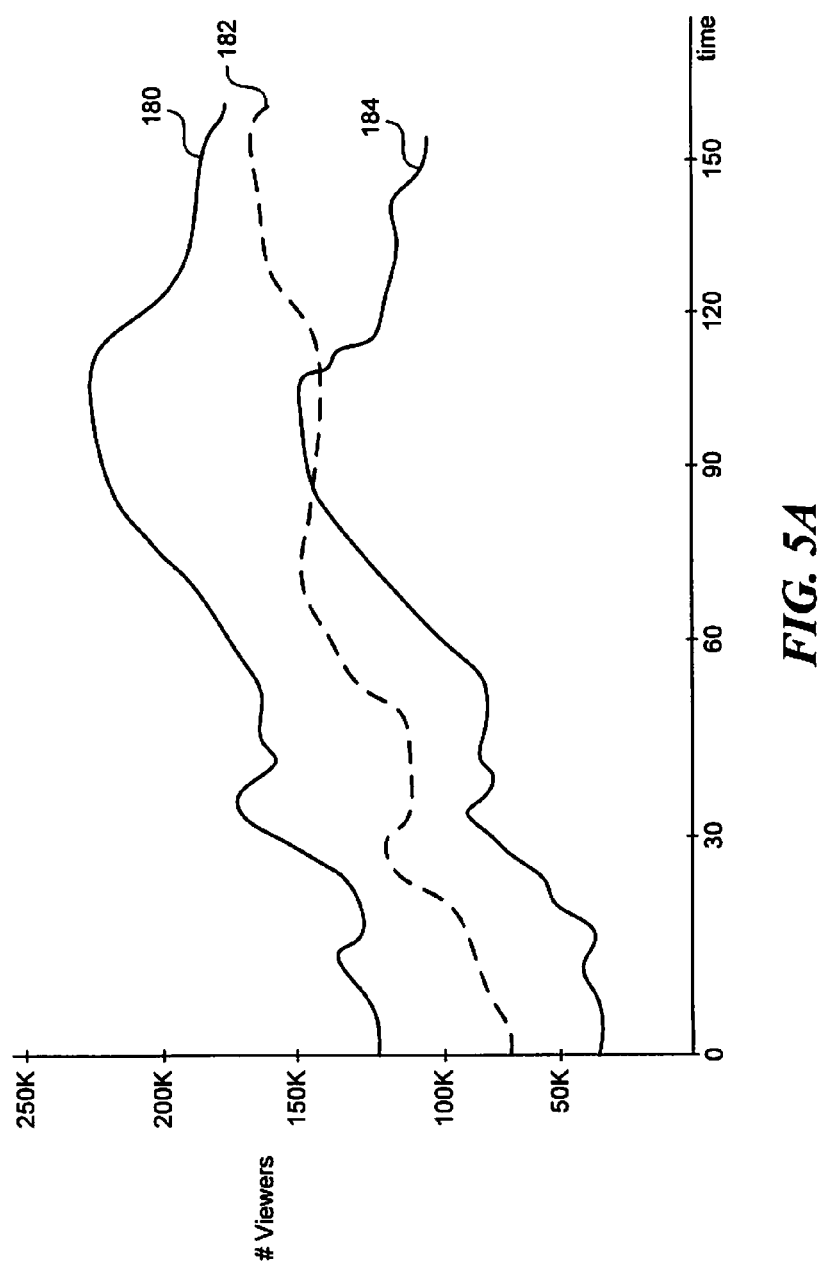
FIG. 5A illustrates a simplified example of a number of program signatures constructed by the system based on subscriber tuning data.

FIG. 5A illustrates a number of sample program signatures 180, 182 and 184. Each program signature provides a time resolved indication of the number of set-top boxes that were tuned to the same channel at any given time and therefore the number of viewers who were likely viewing the program that was presented on that channel. The program signatures are typically not flat for the duration of a program but contain variations in the number of viewers versus time. The particular pattern of changes in the number of viewers versus time is generally unique to each program. For example, many viewers (e.g. 5-20%) will change channels when a commercial is shown regardless of the market in which the program is presented. Moreover, the number of viewers will typically change in a consistent pattern as viewers become disinterested in certain program content and switch to a different channel. For example, many viewers will change channels during a sporting event if one team starts to beat the other team by a significant margin. Because the time and duration of commercials shown in a program is unique to the program, as well as the general viewing behavior of groups of individuals when the groups are sufficiently large, the corresponding program signature is also unique to the program or at least sufficiently unique to determine if two pieces of program content shown in different markets (or the same market at different times) are most likely the same content.

Once the program signature for a particular piece of program content is determined from the set-top box tune data in one market in which it is known that the program was shown, the program signature can then be used by the system to detect if the same piece of program content was likely shown in other market areas or at a different time in the same market.

As shown in FIG. 5A, the program signatures 180 and 184 generally exhibit the same pattern of changes in the number of viewers versus time. The program content associated with the program signature 180 was shown to more viewers than the program content associated with program signature 184. However, by normalizing both program signatures, a comparison of the program signatures can be made to determine if the program signatures likely represent the same program content. For example, assume that program signature 180 was calculated by determining the number of set-top boxes tuned to channel 40 in Market #1 on which the corresponding program content ("Modern Family") was shown. The computing system 100 also calculates the program signature 184 by determining the number of set-top boxes tuned to channel 36 for the time period 8-9 p.m. in Market #2 during which the program "Modern Family" was also scheduled to be presented. By comparing the program signature 180 that is known to represent the program "Modern Family" with the program signature 184 that may or may not represent the program "Modern Family", the program signature comparison component 174 can determine if the program content shown on channel 36 from 8-9 p.m. in Market #2 was likely the same program content that was presented in Market #1. In addition, by summing the number of viewers represented by both program signatures 180 and 184, the total number of potential viewers of the program in both markets can be estimated.

Conversely, assume that the program signature 182 was generated by determining the time varying number of set-top boxes that were tuned to channel 60 in Market #3 during a time slot in which the program "Modern Family" was also supposed to be presented. Because the program signature 182 contains a different pattern of changes in the number of viewers versus time than the changes in the program signature 180, the program signature comparison component 174 can determine that the program content that was actually presented on channel 60 in Market #3 was likely not the program "Modern Family." Moreover, as will be described in additional detail herein, the computing system may be able to ascertain the identity of the program content that corresponds to program signature 182 by comparing other known program signatures with program signature 182 until a similar match is found.

Figure 5B:
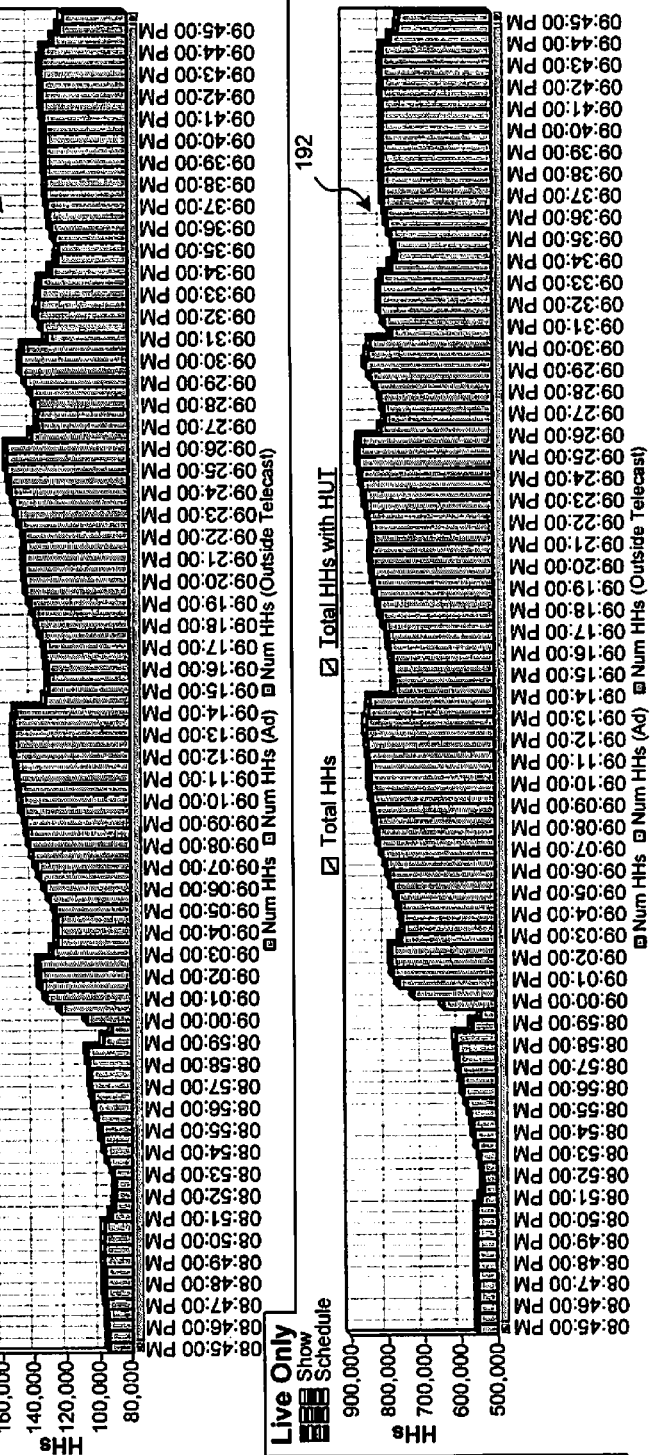
FIG. 5B illustrates a pair of actual program signatures constructed by the system based on subscriber tuning data.

FIG. 5B illustrates a pair of actual program signatures 190 and 192. The program signature 190 was determined for an episode of the CBS program "Two and Half Men" that was known to be presented in a market. The program signature 192 is for an unknown program presented in either the same or a different market and on the same or a different channel. As reflected in the graph, the program signatures 190 and 192 have generally the same shape even though they reflect different numbers of viewers. By matching the program signature 190 to the program signature 192, the computing system can determine that both program signatures likely correspond to the program content "Two and Half Men."

The report generation component 176 operates to provide reports to authorized users about the generated program signatures and various uses of the program signatures. For example, the report generation component 176 allows an authorized user to view, annotate, and manipulate program signatures. The report generation component 176 also generates reports indicating the potential number of viewers in different markets that may have viewed a program, or reports indicating whether a particular piece of program content was presented in any particular market. Such reports may be segmented by time of day, day of week, geographic area, content presenter, etc.

The program signature comparison component 174 determines if two or more program signatures generally match. Numerous pattern matching techniques can be used by the program signature comparison component to perform the matching analysis. For example, the times at which the number of set-top boxes that are tuned to the same channel decrease or increase by more than a predefined amount (e.g. more than 5-10%) can be determined. If the tuning times are substantially the same for both program signatures, then the program signatures can be determined to likely represent the same program. In yet another embodiment, the sum of absolute differences between the data points in two different normalized program signatures can be determined. If the sum of absolute differences is less than some defined value, then the program signatures can be determined to likely represent the same program. As will be appreciated by those of ordinary skill in the art, other statistical comparison techniques could also be used.

Figure 6A:
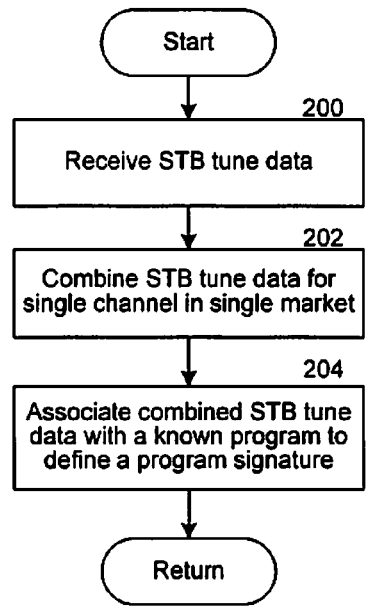
FIGS. 6A-B are flow diagrams of steps performed by the system to generate program signatures and to detect whether a program is presented by comparison with generated program signatures.

FIG. 6A represents a process performed by a programmed computing system in order to construct a program signature for a piece of program content. Beginning at block 200, the computing system receives set-top box tune data. At block 202, the computing system combines set-top box tune data for a single channel in a single market to determine the number of set-top boxes tuned to the same channel at any given time. At block 204, the programmed computing system overlays a program schedule onto the combined set-top box tune data in order to associate a particular program with the combined set-top box tune data thereby defining a program signature for a particular program. The computing system then stores the resulting program signature for subsequent use.

Figure 6B:
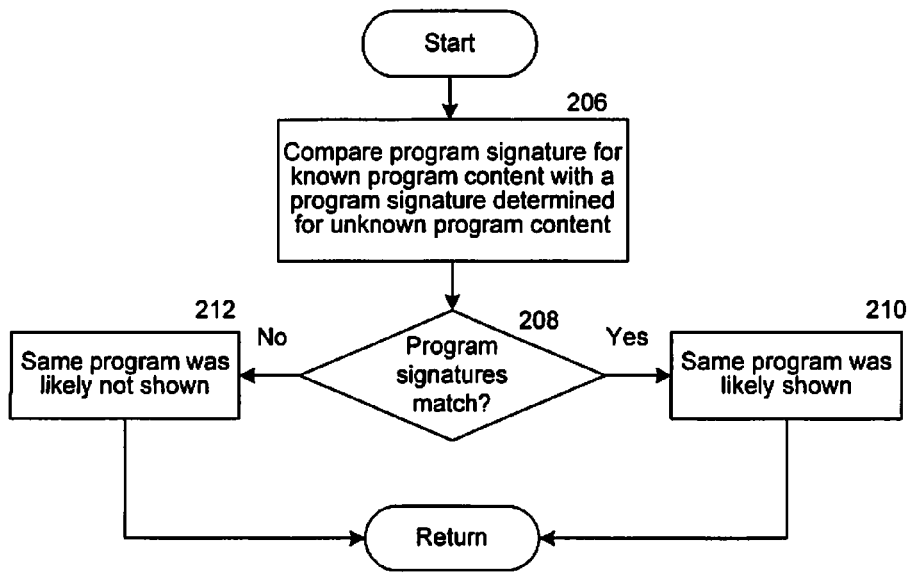

FIG. 6B represents a process performed by a programmed computing system in order to determine whether a piece of program content was presented in a particular market. At block 206, the computing system compares the program signature determined for a local market in which it is known that the program was presented to program signatures determined for program content presented in other local markets (or the same market at different times). At block 208, it is determined if the program signatures for both markets generally match using one or more of the previously-described matching algorithms. If the program signatures are found to match, an indication is provided at block 210 that the same program was likely shown in both markets. If the program signatures do not match, an indication is provided at block 212 that the same program was likely not shown in both markets if the program signatures do not generally match.

While the process described in FIG. 6B may be used to determine whether program content that was presented in a particular timeslot matches a program signature, program signatures may also be used to determine when a particular piece of program content was presented within a particular time range. For example, an advertiser may be interested in determining when a particular piece of program content was actually presented in various markets during the week of July 4th. The computing system may perform, for example, a sliding window matching algorithm to determine whether the program signature of interest matches any of the viewing data during the specified week.

By using the program signature determined for any program content, a report can be provided to advertisers, producers, copyright holders or other interested and authorized individuals to indicate how many people likely viewed the program. Alternatively, if it is determined that a content presenter should have presented a particular program during a predetermined time slot and the program signature for the program that was actually presented does not match the program signature of the program that should have been presented, the program source or network etc. can contact the content presenter to determine why the program schedule was not followed or adjust payments made to the content presenter as a result of the noted discrepancies.

In addition to identifying particular pieces of content that are likely associated with unknown program signatures, an unknown program signature may also be analyzed by the system to assess the type of program content that it represents. Some types of program content exhibit characteristic program signatures that reflect the genre or other characteristics of the content being presented. For example, some programs such as sporting events tend to increase in the number of viewers towards the end of the program. Therefore by knowing a program signature calculated from the aggregated set-top tune data for a particular channel in a market, it may be possible to infer what type of program was shown.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or can be included in, a computer-readable storage device, a computer-readable storage substrate, a random or serial access memory array or device, or a combination of one or more of them. Moreover, while a computer storage medium is not a propagated signal, a non-transitory computer storage medium can be a source or destination of computer program instructions encoded in an artificially-generated propagated signal. The computer storage medium also can be, or can be included in, one or more separate physical components or media (e.g., multiple CDs, disks, or other storage devices). The operations described in this specification can be implemented as operations performed by a data processing apparatus on data stored on one or more computer-readable storage devices or received from other sources.

The term "processor" encompasses all kinds of apparatus, devices, and machines for processing data, including by way of example, a programmable processor, a system on a chip, or multiple ones, or combinations, of the foregoing. The processor can include special purpose logic circuitry, e.g., an FPGA (field programmable gate array) or an ASIC (application-specific integrated circuit). The processor also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The processor and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., an LCD (liquid crystal display), LED (light emitting diode), or OLED (organic light emitting diode) monitor, for displaying information to the user and a keyboard and a pointing device, e.g., a mouse or a trackball, by which the user can provide input to the computer. In some implementations, a touch screen can be used to display information and to receive input from a user. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include any number of clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

From the foregoing, it will be appreciated that specific embodiments of the invention have been described herein for purposes of illustration, but that various modifications may be made without deviating from the scope of the invention. For example, playback data from DVRs can also be used to construct and compare program, signatures. In a digital video recorder, it has been found that users will often fast forward through commercials. Therefore, the times at which users fast forward or otherwise vary the playback of a recorded program can be compared and used to construct and compare program signatures. Similarly, the times at which a user fast forwards or otherwise varies the playback of a program can be correlated and compared against program signatures constructed from channel changes determined from the set-top box tune data. Accordingly, the invention is not limited except as by the appended claims.

We claim:

1. A computer implemented method of determining if program content was presented in a market, comprising:
   comparing, with a computer,
   a first audience signature generated based on a first time series of a varying number of viewers from a first group of viewer data derived from known presented program content, the known presented program content presented to a first market at a first time with
   a second audience signature generated based on a second time series of a varying number of viewers from a second group of viewer data derived from unknown program content, the first time series reflecting changes of the varying number of viewers from the first group and the second time series reflecting changes of the varying number of viewers from the second group, the unknown program content presented to a second market at a second time, the first time different from the second time, the first market different from the second market,
   wherein the comparison is based on a plurality of relations between a first plurality of times of change in a first pattern associated with the first time series and a second plurality of times of change in a second pattern associated with the second time series; and
   determining, with the computer, if the unknown program content is substantially the same as the known program content based on the comparison of the first audience signature and the second audience signature.

2. The computer-implemented method of claim 1, further comprising generating with the computer, the first and second audience signatures by:
   receiving by the computer, set-top box tune data indicative of the channels that are tuned to by set-top boxes in a market; and
   determining with the computer, the number of set-top boxes that were tuned to the same channel.

3. The computer-implemented method of claim 2, further comprising:
   conditioning, with the computer, the set-top box tune data prior to determining the first and second audience signatures.

4. The computer-implemented method of claim 3, wherein the conditioning includes removing, with the computer, set-top box tune data representing channel changes of less than a defined duration.

5. The computer implemented method of claim 1, wherein comparing the first audience signature determined for the known program and the second audience signature determined for the unknown program includes:
   comparing, with the computer, the times at which a number of set-top boxes tuned to the channels on which the known and unknown program were presented vary by more than a defined amount.

6. A computing system comprising:
   a memory for storing a sequence of program instructions;
   at least one processor that is configured to execute the sequence of instructions to determine if a program was presented, by:
   comparing
   a first audience signature generated based on a first time series of a varying number of viewers from a first group of viewer data derived from a first group of viewer data derived from known presented program content, the known presented program content presented to a first market at a first time
   with a second audience signature generated based on a second time series of a varying number of viewers from a second group of viewer data derived from unknown program content, the first time series reflecting changes of the varying number of viewers from the first group and the second time series reflecting changes of the varying number of viewers from the second group, the unknown program content presented to a second market at a second time, the first time different from the second time, the first market different from the second market,
   wherein the comparison is based on a plurality of relations between a first plurality of times of change in a first pattern associated with the first time series and a second plurality of times of change in a second pattern associated with the second time series; and
   determining if the program was presented on the second channel based on the comparison of the second audience signature and the first audience signature.

7. The computing system of claim 6, wherein the at least one processor is configured to execute instructions that cause the at least one processor to determine the first and second audience signatures by:
   receiving set-top box tune data indicative of the channels that are tuned to by set-top boxes; and
   determining the number of set-top boxes that were tuned to the same channel.

8. The computing system of claim 7, wherein the at least one processor is configured to execute instructions that cause the at least one processor to condition the set-top box tune data prior to determining the first and second audience signatures.

9. The computing system of claim 8, wherein the at least one processor is configured to execute instructions that cause the at least one processor to condition the set-top box tune data by removing set-top box tune data representing channel changes of less than a defined duration.

10. The computing system of claim 8, wherein the at least one processor is configured to execute instructions that cause the at least one processor to compare the first and second audience signatures by comparing the times at which a number of set-top boxes tuned to the first channel on which it is known that the program was presented and the second channel on which it is not known if the program was presented vary by more than a defined amount.

11. A non-transitory, computer readable media with instructions stored thereon that when executed by at least one processor, cause the at least one processor to perform a method comprising:
   comparing
   a first audience signature generated based on a first time series of a varying number of viewers from a first group of viewer data determined from known presented program content, the known presented program content presented to a first market at a first time, with
   a second audience signature generated based on a second time series of a varying number of viewers from a second group of viewer data determined from unknown presented program content, the first time series reflecting changes of the varying number of viewers from the first group and the second time series reflecting changes of the varying number of viewers from the second group, the unknown program content presented to a second market at a second time, the first time different from the second time, the first market different from the second market,
wherein the comparison is based on a plurality of relations between a first plurality of times of change in a first pattern associated with the first time series and a second plurality of times of change in a second pattern associated with the second time series; and
determining if the unknown presented program content is substantially the same as the known presented program content based on the comparison of the first audience signature and second audience signature.

12. The non-transitory computer readable media of claim 11, further including instructions that when executed cause at least one processor to:
receive set-top box tune data indicative of the channels that are tuned to by set-top boxes; and
determine the number of set-top boxes that are tuned to the same channel on which the known and unknown program content were shown.

13. The non-transitory computer readable media of claim 12, further including instructions that when executed cause at least one processor to condition the set-top box tune data prior to determining the first and second audience signatures.

14. The non-transitory computer readable media of claim 13, further including instructions that when executed cause at least one processor to condition the set-top box tune data by removing set-top box tune data representing channel changes of less than a defined duration.

15. The non-transitory computer readable media of claim 14, further including instructions that when executed cause at least one processor to compare the first and second audience signatures by comparing the times at which a number of set-top boxes tuned to the channel on which the known and unknown program were shown vary by more than a defined amount.

16. A computer implemented method of determining if a viewer has viewed a program, comprising:
comparing, with a computer, a first audience signature for known presented program content with a second audience signature representing variations in a playback of unknown recorded program content, the known presented program content presented to a first market at a first time and the unknown program content presented to a second market at a second time, the first time different from the second time, the first market different from the second market; and
determining, with the computer, if the viewer has viewed the known program content based on the comparison of the first and second audience signatures,
wherein the first audience signature is generated based on a first time series of a varying number of viewers from a first group,
wherein the second audience signature is generated based on a second time series of a varying number of viewers from a second group, and
wherein the comparison is based on a plurality of relations between a first plurality of times of change in a first pattern associated with the first time series and a second plurality of times of change in a second pattern associated with the second time series.

17. The computer implemented method of claim 16, wherein the first audience signature is indicative of the times of commercials in the known program content.

18. The computer implemented method of claim 16, wherein the second audience signature represents times at which the viewer is not viewing portions of the unknown recorded program content at a normal speed.

19. The computer implemented method of claim 1, wherein the first group of viewer data includes viewer data from a first geographic market and the second group of viewer data includes viewer data from a second geographic market.

20. The computing system of claim 6, wherein the first group of viewer data includes viewer data from a first geographic market and the second group of viewer data includes viewer data from a second geographic market.

* * * * *